United States Patent
Haines

(10) Patent No.: US 10,110,439 B2
(45) Date of Patent: Oct. 23, 2018

(54) IDENTIFYING CRITICAL NODES IN A WIRELESS NETWORK USING NETWORK TOPOLOGY

(71) Applicant: Kabushiki Kaisha Toshiba, Minato-ku (JP)

(72) Inventor: Russell John Haines, Bristol (GB)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/117,101

(22) PCT Filed: Mar. 17, 2014

(86) PCT No.: PCT/GB2014/050838
§ 371 (c)(1),
(2) Date: Aug. 5, 2016

(87) PCT Pub. No.: WO2015/140483
PCT Pub. Date: Sep. 24, 2015

(65) Prior Publication Data
US 2017/0149616 A1 May 25, 2017

(51) Int. Cl.
*H04L 12/24* (2006.01)
*H04L 12/721* (2013.01)
(Continued)

(52) U.S. Cl.
CPC ............ *H04L 41/12* (2013.01); *H04L 45/123* (2013.01); *H04W 40/14* (2013.01); *H04W 72/06* (2013.01); *H04W 84/18* (2013.01)

(58) Field of Classification Search
CPC ......... H04L 41/12; H04L 45/00; H04L 45/02; H04L 45/04; H04L 45/12; H04L 45/16;
(Continued)

(56) References Cited

U.S. PATENT DOCUMENTS

| | | | |
|---|---|---|---|
| 2010/0271936 A1* | 10/2010 | Allan | H04L 12/462 370/225 |
| 2013/0064070 A1* | 3/2013 | Kolavennu | H04L 41/142 370/223 |

(Continued)

FOREIGN PATENT DOCUMENTS

| | | |
|---|---|---|
| EP | 2 568 663 A1 | 3/2013 |
| WO | WO 2012/064794 | 5/2012 |

OTHER PUBLICATIONS

International Search Report and Written Opinion of the International Searching Authority dated Mar. 9, 2015 in PCT/GB2014/050838 filed Mar. 17, 2014.

(Continued)

*Primary Examiner* — Peter Chen
(74) *Attorney, Agent, or Firm* — Oblon, McClelland, Maier & Neustadt, L.L.P.

(57) ABSTRACT

In an embodiment, a method of identifying critical nodes in a wireless network from a network topology graph for the network, the wireless network comprising a plurality of nodes and a plurality of links between the nodes, and the network topology graph for the network indicating the plurality of links between the nodes comprises: selecting each node in turn as a candidate node, and for each candidate node: generating a network topology graph for a sub-network comprising all of the nodes of the wireless network except the candidate node; determining from the network topology graph for the sub-network if the sub-network is fully reachable; and generating an indication that the candidate node is a critical node if the sub-network is not fully reachable.

15 Claims, 7 Drawing Sheets

(51) Int. Cl.
*H04W 72/06* (2009.01)
*H04W 40/14* (2009.01)
*H04W 84/18* (2009.01)

(58) Field of Classification Search
CPC ......... H04L 45/22; H04L 45/26; H04L 45/28;
H04L 45/48; H04L 45/123; H04L 67/10;
H04W 40/00; H04W 40/14; H04W
40/246; H04W 72/06; H04W 84/18
See application file for complete search history.

(56) References Cited

U.S. PATENT DOCUMENTS

2013/0064139 A1* 3/2013 Kolavennu ............ H04L 41/12
370/255
2013/0163407 A1* 6/2013 Sinha ................... H04W 40/12
370/217

OTHER PUBLICATIONS

International Preliminary Report on Patentability and Written Opinion of the International Searching Authority dated Sep. 29, 2016 in PCT/GB2014/050838 filed Mar. 17, 2014.
Milenko Jorgic et al., "Localized Algorithms for Detection of Critical Nodes and Links for Connectivity in Ad hoc Networks" Retrieved from the Internet: URL:https://hal.archives-ouvertes.fr/file/index/docid/616857/filename/JSHS-medhocnet04.pdf, XP055156181, Dec. 1, 2003, 13 Pages.
Jörg Hähner et al., "Quantifying Network Partitioning in Mobile Ad Hoc Networks", International Conference on Mobile Data Management, XP055156502, May 1,2007, pp. 174-181.
Ketaki Vaidya, et al., "Efficient Failure Recovery in Wireless Sensor Networks through Active Spare Designation", Distributed Computing in Sensor Systems Workshops, 6$^{th}$ IEEE International Conference, XP032183242, Jun. 21, 2010, 6 Pages.
E. W. Dijkstra, "A Note on Two Problems in Connexion with Graphs," Numerische Mathematik, vol. 1, No. 1, 1959, pp. 269-271.
Guo-Hui Lin, et al. "Steiner tree problem with minimum number of Steiner points and bounded edge-length," Elsevier's Information Processing Letters, vol. 69, No. 2, 1999, pp. 53-57.
Tae-Hoon Kim, et al. "Connectivity and Critical Point Behavior in Mobile Ad hoc and Sensor Networks," IEEE Symposium on Computers and Communications (ISCC), 2009, pp. 1-6.
Linton C. Freeman, "Centrality in Social Networks: Conceptual Clarification," Elsevier's Social Networks, vol. 1, 1979, pp. 215-239.
Min Sheng, et al. "Critical Nodes Detection in Mobile Ad Hoc Network," 20th International Conference on Advanced Information Networking and Applications (AINA), 2006, pp. 1-5.
Neelofer Tamboli, et al. "Coverage-Aware Connectivity Restoration in Mobile Sensor Networks," IEEE International Conference on Communications (ICC), 2009, pp. 1-5.
Stephen P. Borgatti, "Identifying Sets of Key Players in a Network," International Conference on Integration of Knowledge Intensive Multi-Agent Systems (KIMAS), 2003, pp. 127-131.
Ashwin Arulselvan, et al., "Detecting Critical Nodes in Sparse Graphs," Elsevier's Computers & Operations Research, vol. 36, No. 7, 2009, pp. 1-15.
Feng Wang, et al. "Traffic-Aware Relay Node Deployment: Maximizing Lifetime for Data Collection Wireless Sensor Networks," IEEE Transactions on Parallel and Distributed Systems, 2010, pp. 1-13.
Abdullah Alfadhly, et al. "Optimal Node Repositioning for Tolerating Node Failure in Wireless Sensor Actor Network," 25th Biennial Symposium on Communications (QBSC), 2010, pp. 67-71.

* cited by examiner

IDENTIFYING CRITICAL NODES IN A WIRELESS NETWORK USING NETWORK TOPOLOGY

FIELD

Embodiments described herein relate generally to the analysis and management of wireless networks, and in particular to multi-hop ad-hoc mesh networks.

BACKGROUND

A multi-hop ad-hoc wireless mesh network made up of a plurality of nodes and a plurality of links between the nodes. Routing in such networks is carried out by data being forwarding data to other nodes so that data passes from a source node to a destination node as a series of hops. A multi-hop ad-hoc wireless mesh network is considered to be fully reachable if any given node of the network can be reached from any other given node with an arbitrary number of waypoints and hops.

Examples of multi-hop ad-hoc wireless mesh networks are a disaster-relief or defense device drops. For example, swarm of sensor nodes may be dropped over a wide area to gather information. The sensor nodes can be anything from gas/radiation detectors to sensitive seismographs. Information can then be collated from all nodes. Another example is dropping a swarm of multi-hop communications relays over a wide area to re-establish communications where the primary infrastructure has been destroyed. Further examples are a pop-up mote array providing connectivity at an event such as a festival and a communications or sensor array in a shopping mall.

A node is considered to be a critical node in a fully reachable network if the removal or failure of that node results in the network no longer being fully reachable.

BRIEF DESCRIPTION OF THE DRAWINGS

In the following, embodiments will be described as examples with reference to the drawings in which.

DETAILED DESCRIPTION

Figures 1A, 1B:
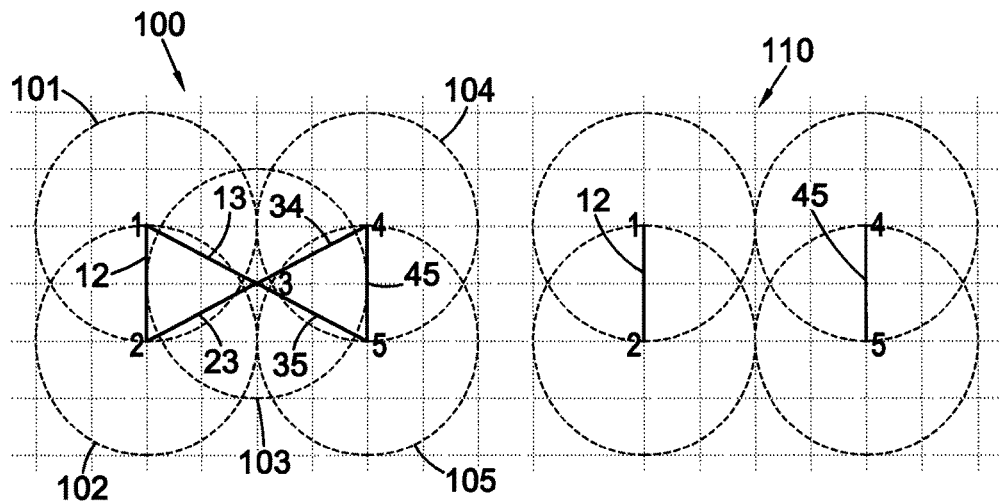
FIGS. 1a and 1b show a critical node in a wireless network.

In an embodiment, a method of identifying critical nodes in a wireless network from a network topology graph for the network, the wireless network comprising a plurality of nodes and a plurality of links between the nodes, and the network topology graph for the network indicating the plurality of links between the nodes comprises: selecting each node in turn as a candidate node, and for each candidate node: generating a network topology graph for a sub-network comprising all of the nodes of the wireless network except the candidate node; determining from the network topology graph for the sub-network if the sub-network is fully reachable; and generating an indication that the candidate node is a critical node if the sub-network is not fully reachable.

In an embodiment, the method further comprises determining a criticality measure for the candidate node if the sub-network is not fully reachable.

In an embodiment, the method further comprises comparing the criticality measure with a threshold and generating an indication that the candidate node is a super-critical node based on the result of the comparison.

In an embodiment, determining the criticality measure for the candidate node comprises determining, for each node of the sub-network, the number of other nodes of the sub-network that cannot be reached from that node.

In an embodiment, determining the criticality measure for the candidate node comprises dividing the number of unreachable nodes by the number of nodes in the sub-network.

In an embodiment, each node of the network is considered to be equal.

In an embodiment, determining from the network topology graph for the sub-network if the sub-network is fully reachable comprises determining possible paths between the nodes of the sub-network.

In an embodiment, determining from the network topology graph for the sub-network if the sub-network is fully reachable comprises applying a shortest path finding algorithm to the sub-network.

In an embodiment, the shortest path finding algorithm is the Dijkstra algorithm.

In an embodiment, the method further comprises ranking the nodes according to the criticality measures.

In an embodiment, the method further comprises allocating a network resource according to the ranking.

In an embodiment, a computer readable carrier medium carries processor executable instructions which when executed on a processor cause the processor to carry out a method as described above.

In an embodiment, a data processing system comprises: a memory configured to store a network topology graph for a wireless network, the wireless network comprising a plurality of nodes and a plurality of links between the nodes, and the network topology graph for the network indicating the plurality of links between the nodes; and a processor operable to: select each node in turn as a candidate node, and for each candidate node: generate a network topology graph for a sub-network comprising all of the nodes of the wireless network except the candidate node; determine from the network topology graph for the sub-network if the sub-network is fully reachable; and generate an indication that the candidate node is a critical node if the sub-network is not fully reachable.

In an embodiment, the processor is further operable to determine a criticality measure for the candidate node if the sub-network is not fully reachable.

In an embodiment, the processor is further operable to compare the criticality measure with a threshold and to generate the indication that the candidate node is a super-critical node based on the result of the comparison.

In an embodiment, the processor is operable to determine the criticality measure for the candidate node by determining, for each node of the sub-network, the number of other nodes of the sub-network that cannot be reached from that node.

In an embodiment, the processor is operable to determine the criticality measure for the candidate node by dividing the number of unreachable nodes by the number of nodes in the sub-network.

In an embodiment, the processor is operable to determine from the network topology graph for the sub-network if the sub-network is fully reachable by applying a shortest path finding algorithm to the sub-network.

In an embodiment, the processor is further operable to rank the nodes according to the criticality measures.

In an embodiment, a network controller comprises the data processing system and the network controller is operable to allocate a network resource according to the rank of the nodes.

The described embodiments can be incorporated into a specific hardware device, a general purpose device configure by suitable software, or a combination of both. Aspects can be embodied in a software product, either as a complete software implementation, or as an add-on component for modification or enhancement of existing software (such as a plug in). Such a software product could be embodied in a carrier medium, such as a storage medium (e.g. an optical disk or a mass storage memory such as a FLASH memory) or a signal medium (such as a download).

Specific hardware devices suitable for the embodiment could include an application specific device such as an ASIC, an FPGA or a DSP, or other dedicated functional hardware means. The reader will understand that none of the foregoing discussion of embodiment in software or hardware limits future implementation of the invention on yet to be discovered or defined means of execution.

FIG. 1a shows a wireless network 100. The wireless network 100 comprises five nodes 1, 2, 3, 4 and 5. The nodes are in a bow-tie topology. The dotted circles 101, 102, 103, 104 and 105 indicate the transmission ranges of the nodes. In this example the transmission ranges are idealised as a binary unit-disc of coverage. When a node falls within the transmission range of another node, the two nodes can communicate with each other. This is results in a link between the two nodes being formed. As shown in FIG. 1a, there is a link 12 between the first node 1 and the second node 2, a link 13 between the first node 1 and the third node 3, and a link 23 between the second node 2 and the third node 3. There is also a link 34 between the third node 3 and the fourth node 4, a link 35 between the third node 3 and the fifth node 5, and a link 45 between the fourth node 4 and the fifth node 5. Since all of the nodes of the wireless network 100 can be reached from any one of the nodes, the wireless network 100 is fully reachable.

FIG. 1b shows a wireless network 110 resulting from the failure of the third node 3 of the wireless network 100 shown in FIG. 1a. As shown in FIG. 1b, the removal of the third node 3 results in the network ceasing to be fully reachable since the first node 1 cannot be reached from the fourth node 4 or the fifth node 5. Only the link 12 between the first node 1 and the second node 2 and the link 45 between the fourth node 4 and the fifth node 5 remain. The wireless network 110 is split into two sub-networks: a first sub-network formed by the first node 1 and the second node 2; and a second sub-network formed by the fourth node 4 and the fifth node 5. The third node 3 in the wireless network 100 shown in FIG. 1a is said to be a critical node because its removal results in the wireless network ceasing to be fully reachable.

Figure 2:
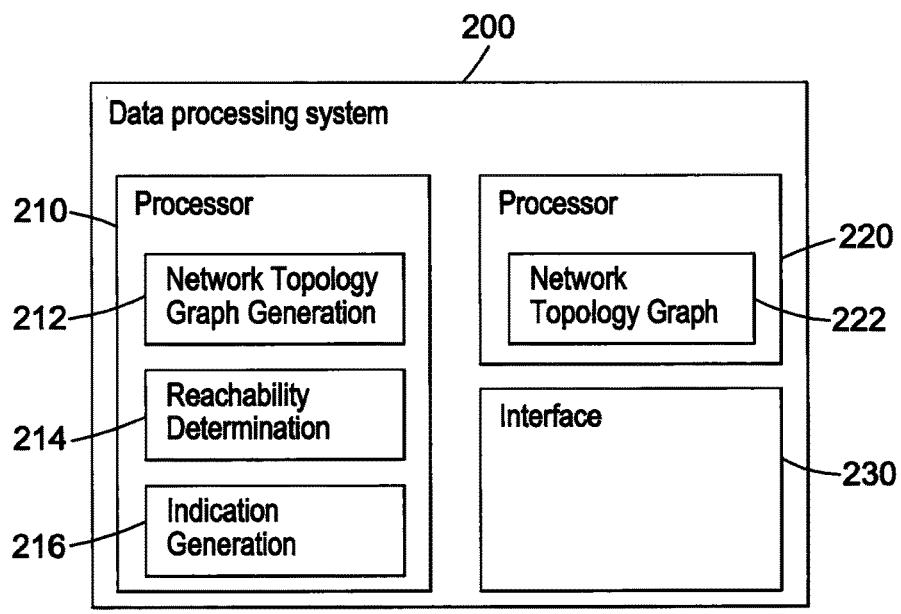
FIG. 2 shows a data processing system according to an embodiment.

FIG. 2 shows a data processing system 200 according to an embodiment. The data processing system 200 functions to identify critical nodes in wireless networks. The data processing system comprises a processor 210, a memory 220 and an interface 230. The processor 210 executes three computer program modules: a network topology graph generation module 212, a reachability determination module 214 and an indication generation module 216. The memory 220 stores a network topology graph 222 for the wireless network that is being analysed to identify critical nodes. The interface 230 allows data and information to be input and output from the data processing system 200.

It is envisaged that the data processing system 200 could be embodied in a number of different ways.

The data processing system 200 could be embodied as a node of a wireless network. In which case, network topology graph 222 could be generated on the data processing system 200 from information received from other nodes. In this case the interface may comprise a wireless network interface to receive data from other nodes and user interface such as a display to allow the system to communicate with humans and give information on critical nodes within a network and thus warn of impending network problems.

The data processing system 200 could be embodied as an inspection device, for example maintenance probe device or a technician's laptop, which receives network topologies prior to the deployment of wireless networks.

The network topology graph 222 stored in the memory 220 indicates the nodes and links of the wireless network being analysed. The network topology graph 222 shows the network from a radio perspective. Here it is noted that this may differ from the geographical layout of the network as the radio perspective will take into account source of signal fading and reflections. The network topology graph 222 may be determined from a connectivity list from each node, not known in advance, but built up by getting a neighbour-list from each node. Alternatively, the network topology graph 222 may be a plan of a network that is yet to be deployed.

The network topology graph 222 shows the static structure of the network. That is it shows the nodes and the links between them but does not necessarily include information about the traffic flows between nodes of the network.

Figure 3:
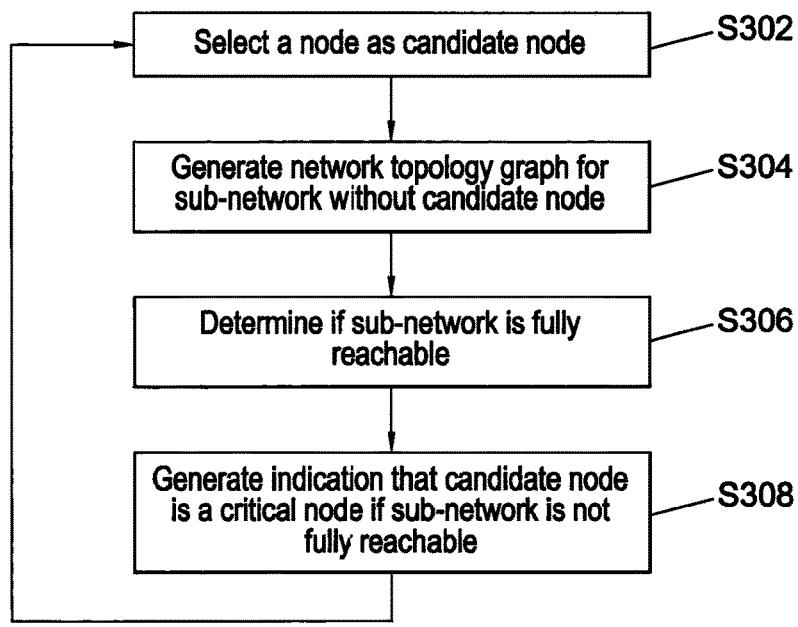
FIG. 3 shows a method of identifying critical nodes in a wireless network according to an embodiment.

FIG. 3 is a flowchart illustrating a method of identifying critical nodes in a wireless network according to an embodiment. The method shown in FIG. 3 is executed by the processor 210 of the data processing system 200 shown in FIG. 2.

The method shown in FIG. 3 is used to analyse the network topology graph 222 stored in the memory 220. As discussed above, the network topology graph 222 indicates the nodes and the links of the wireless network under consideration.

In step S302, a node of the wireless network is selected as a candidate node. In step S304, the network topology graph generation module 212 generates a network topology graph for a sub-network without the candidate node.

In step S306, the reachability determination module 214 determines if the sub-network is fully reachable. In step S306 it is determined whether every node of the sub-network which does not include the candidate node can reach every other node in the sub-network.

In step S308 the indication generation module 216 generates an indication that the candidate node is a critical node if the sub-network is not fully reachable. Following step S308, the method returns to step S302 in which another node is selected as the candidate node, the method is repeated until every node of the network has been considered as a candidate node.

Figure 4:
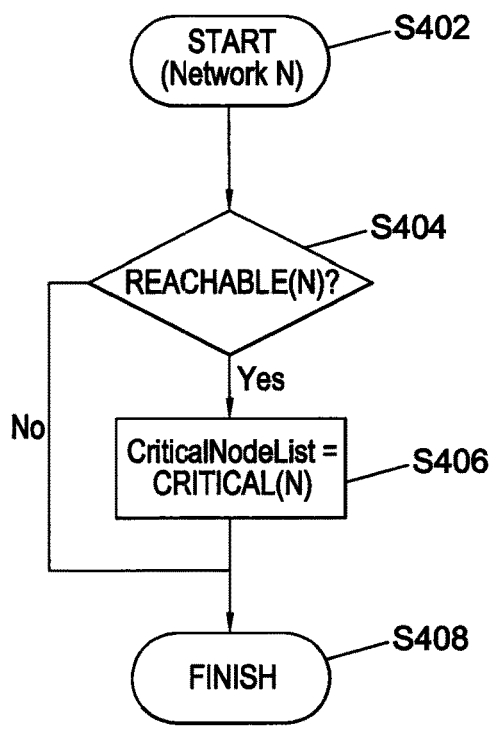
FIG. 4 shows a method of identifying critical nodes in a wireless network according to an embodiment.

FIG. 4 shows a flowchart illustrating a method identifying critical nodes in a network according to an embodiment. The method starts in step S402. A network N comprising a plurality of nodes and a plurality of links is analysed. In step S404, it is determined whether the network N is reachable. If the network N is not reachable the method moves to step S408 and finishes. If the network N is reachable the method moves to step S406. In step S406, a list of critical nodes is generated. The list of critical nodes may be generated using the method shown in FIG. 3 which is described above.

As shown in FIG. 4, the first step of the method involves determining if the network is fully reachable. This may be achieved by asking what the shortest path from a given start point to a given end point is, for all start points and all end points.

An example of a shortest path algorithm is the Dijkstra algorithm. For a given node, the Dijkstra Algorithm will find the path with lowest cost (i.e. the shortest path) between that given node and every other node according to the following algorithm:

1. Assign distance to the first node as 0 (logically), and initially assign infinity for all others.
2. Mark all nodes as "unvisited", apart from the first node.
3. For the current node, consider all unvisited neighbours. Add the distance to get the current node to the distance to each neighbour. If that combined distance is less than the any other route to that neighbour that has been found before, update the record for that neighbour (the neighbours remain "unvisited").
4. Once all neighbours considered, mark the current node as visited, never to be returned to again.
5. Select the next unvisited node that is marked with the smallest distance so far, set it as the new "current node": goto step 3.

The algorithm finishes when all nodes that can be reached have been visited (either all "visited" or none of the remaining can be reached).

The basic algorithm runs in a fairly unscalable order of $O(|N|2)$, where $|N|$ is the number of nodes, i.e. it scales to the square of the number of nodes.

Other shortest-path or possible-path algorithms can be used in place of the Dijkstra Algorithm. For example, the Bellman-Ford algorithm, or the heuristic-based "A*" algorithm and its descendants and derivatives which are more efficient may be used. The A* algorithm is somewhere between exponential in the length of the shortest path and polynomial in the best case that fits the heuristic embedded in the algorithm.

The method shown in FIG. 4 is set out below:

```
For a network N, where i is a node within network N:
    ∀ i ∈ (N)
        Can i reach all other nodes in N?
        If no, END.
        If yes:
            ∀ i ∈ (N)
                Is (N-i) fully reachable?
                If yes: i is not a critical node
                If no: i is a critical node
        Report all critical nodes.
```

In the above method, critical nodes are identified by considering structural, static node connectivity, where there is no a priori knowledge of traffic flows through the active network. This allows the analysis to be performed off-line, for example, during initial deployment. In embodiments, the network is a fully-reachable multi-hop ad hoc mesh network with arbitrary or random node locations where all nodes are considered to have equal value and utility.

The approach involves temporarily removing each node in turn from the network and determining the reachability of the resulting sub-network by invoking the Dijkstra algorithm again. Any node, that once removed, results in a system without a fully-reachable network is considered to be a critical node. This is the "fully reachable" test in the algorithm above.

As discussed above, other shortest-path or possible-path algorithms may be used in place of the Dijkstra algorithm.

In the methods described above, critical nodes are identified as those that, if lost, would cause the network to split into sub-networks, destroying the reachability, and utility, of the system.

The continued operation of these nodes is critical. Having identified these nodes, the operator of the mesh network can then seek to mitigate the problem: add more nodes in the region of the critical node to offer more resilience, boost the power available to that node (e.g. if the risk is that the node will run out of power), have a hot standby ready to replace a dead node in the event of failure, and so on.

In some circumstances, the view that any node that bifurcates the network if lost is "critical" is may not be entirely appropriate. Consider the example network shown in FIG. 5.

Figure 5:
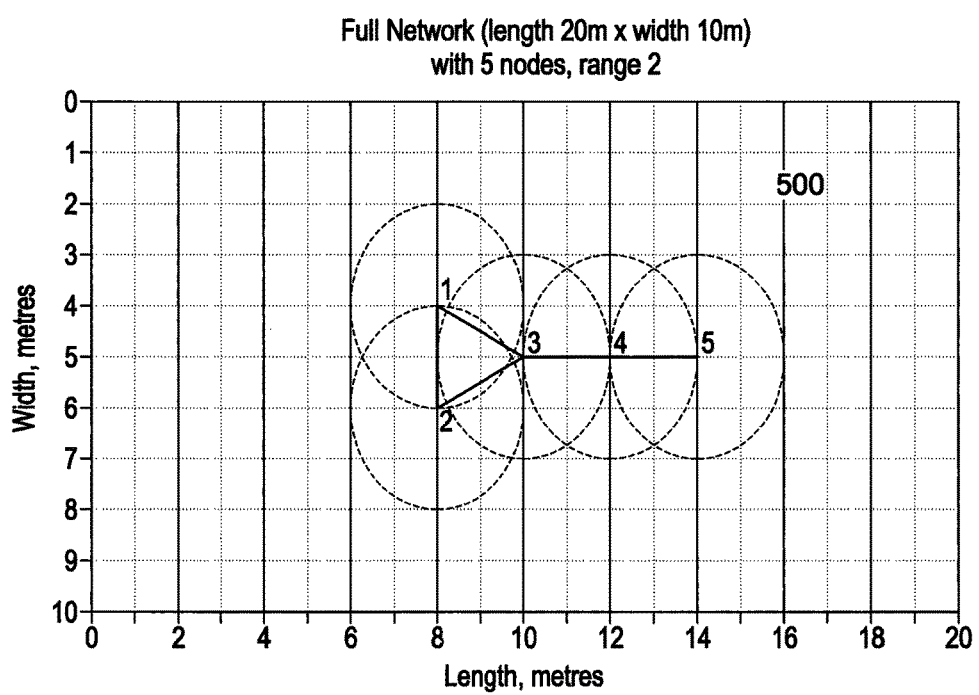
FIG. 5 shows a wireless network.

FIG. 5 shows an example network 500. The network comprises 5 nodes. A first node 1 has a links to a second node 2 and a third node 3. The second node 2 has a link to the third node 3. The third node 3 has a link to a fourth node 4. The fourth node 4 has a link to a fifth node 5. Clearly, the loss of node 3 is catastrophic to the network, splitting it into two sub-networks (the node 1-2 segment, and the node 4-5 segment). However, the loss of node 4 would be less clear cut: on the left is the sizeable sub-network 1-2-3, and on the right just the lone node 5.

In order to account for the differing impact that the loss of different nodes may have on a network, the concept of a 'super-critical' node is introduced.

Figure 6:
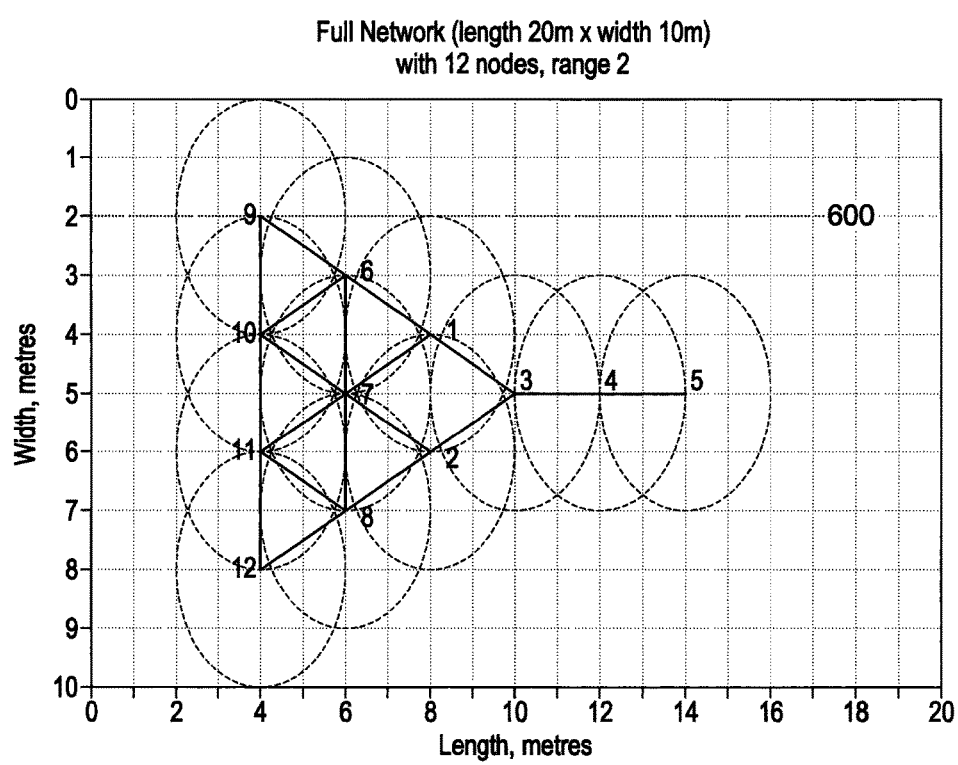
FIG. 6 shows a wireless network.

This distinction between critical- and super-critical-nodes can be made clearer and more emphatically with the example network in FIG. 6.

FIG. 6 shows an example network 600. The network 600 corresponds to the network 500 shown in FIG. 5 with extra nodes added. A sixth node 6, a seventh node 7, an eighth node 8, a ninth node 9, a tenth node 10, an eleventh node 11 and a twelfth node 12 are added to the network.

In the network 600, node 5 is clearly an outlier, an offshoot on the end of a small cul-de-sac branch of the network. The loss of node 3 will be felt more keenly than the loss of node 4.

Figure 7:
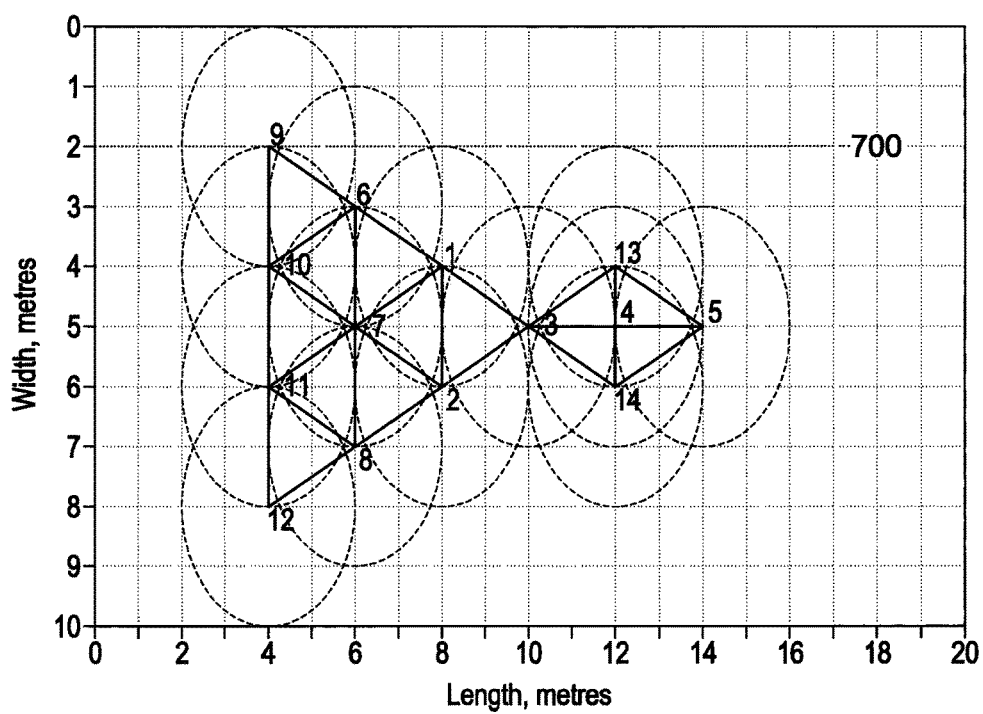
FIG. 7 shows a wireless network.

Even if the size of the resulting sub-networks are balanced out slightly more as shown in FIG. 7, it can still be appreciated that node 3 has more value (in terms of traffic routing) than any other.

FIG. 7 shows an example network 700. The network 700 corresponds to the network 600 shown in FIG. 6 with additional extra nodes added. A thirteenth node 13 and a fourteenth node 14 are added with connections to the third node 3, the fourth node 4 and the fifth node 5.

In the embodiments described below, a criticality measure is considered which gives information on how critical a node is in terms of the damage its loss causes. This is achieved by considering the number of unreachable nodes once the candidate critical node has been removed with respect to the total number of nodes.

Figure 8:
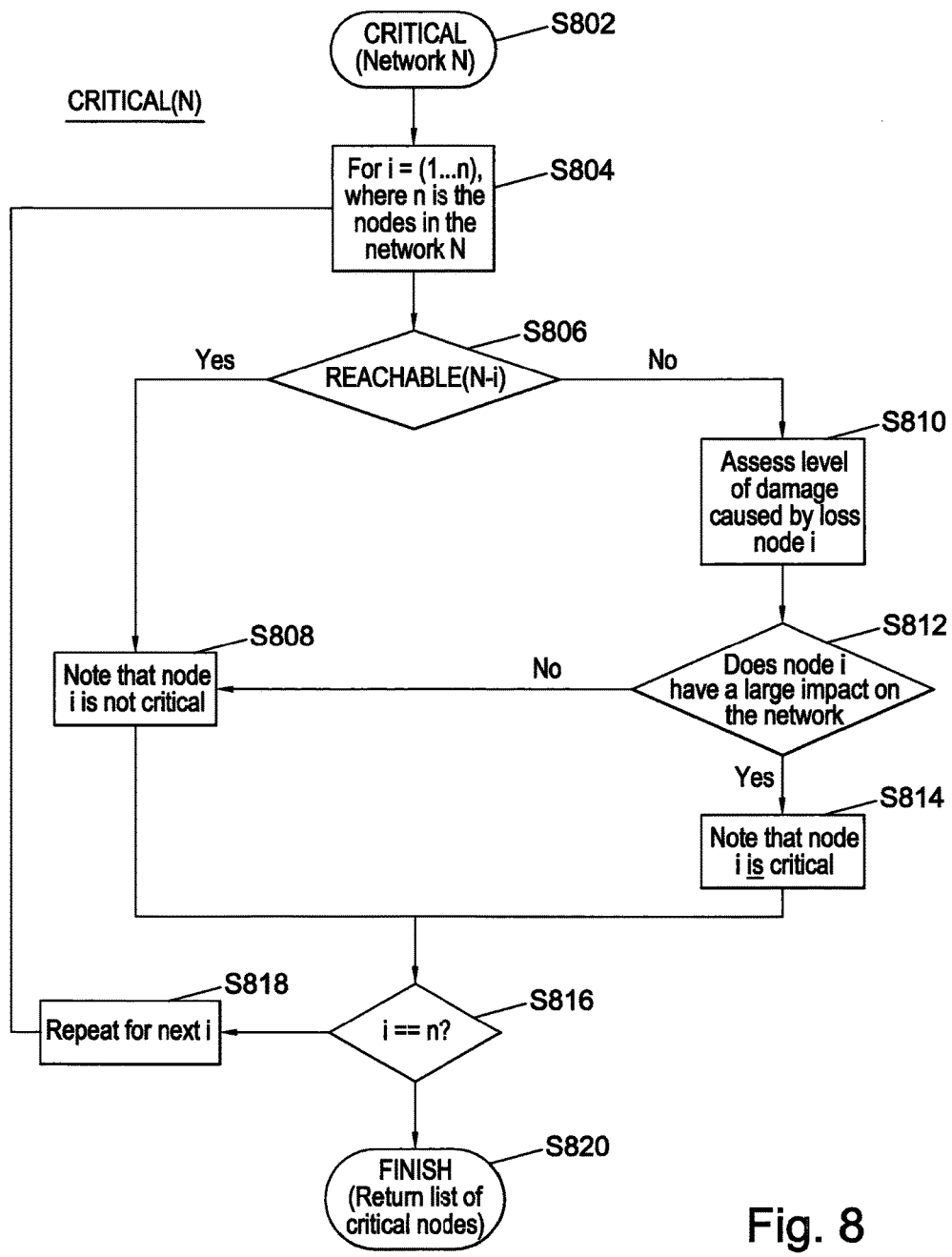
FIG. 8 shows a method of identifying critical nodes in a wireless network according to an embodiment.

FIG. 8 is a flowchart illustrating a method of identifying critical nodes in a network according to an embodiment. The method illustrated in FIG. 8 acts on a network topology graph of a network N. The method shown in FIG. 8 may be implemented as the step S406 shown in FIG. 4.

The method starts with step S802. The input to the method is the network topology graph of the network N under consideration. The network N comprises n nodes. In step S804, the ith node of the network is selected. Initially i=1. In step S806 a determination is made whether the sub-network (N-i), that is the network N without the ith node, is fully reachable. As described above, step S806 may be implemented using a possible-path or shortest-path algorithm. If the sub-network (N-i) is fully reachable, then is it noted in step S808 that the ith node is not a critical node. Following step S808, it is determined in step S816 whether all nodes have been considered.

If in step S806 it is determined that the sub-network (N-i) is not fully reachable, then the method moves to step S810. In step S810 an assessment of the damaged caused by the loss of node i is made. This may involve calculating the total number of unreachable nodes if each node of the sub-network (N-i) is considered in turn. This is described in more detail below with reference to FIG. 9.

In step S812 a determination is made whether the loss of node i has a large impact on the network N. If the loss of the node i does not have a large impact on the network N, then the method moves to step S808 in which the node i is noted as not being a critical node. If the loss of the node i does have a large impact on the network N, then node i is noted as being a critical node in step S814.

In step S816 it is checked whether all of the n nodes of the network have been considered. This is carried out by checking if i is equal to n. If i is not equal to n, then i is incremented in step S818 and the method returns to step S804 for the new candidate node. If i is equal to n, then the method finishes in step S820 and a list of critical nodes is output.

Figure 9:
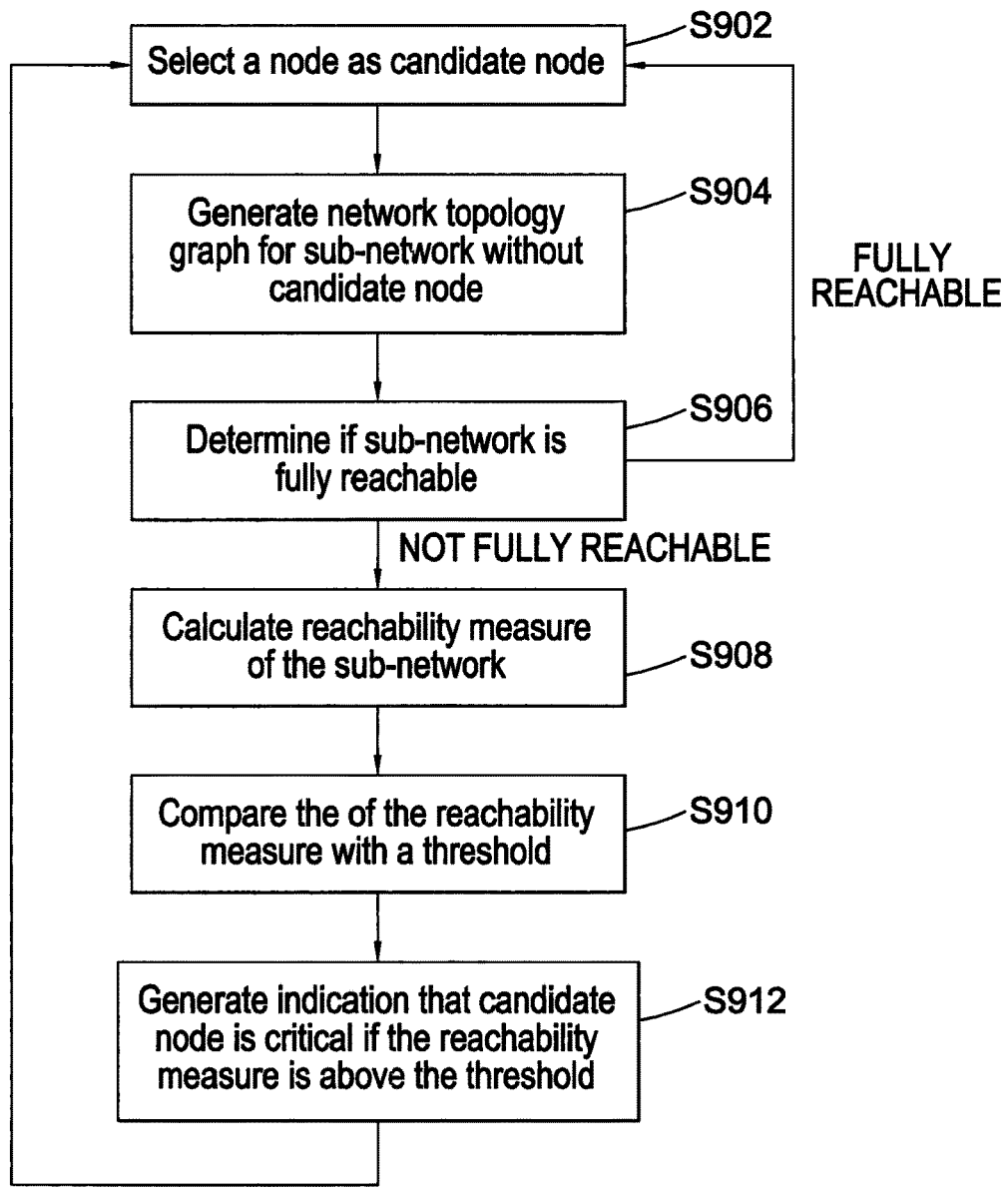
FIG. 9 shows a method of identifying critical nodes in a wireless network according to an embodiment.

FIG. 9 is a flowchart showing a method of identifying critical nodes in a network according to an embodiment.

The method shown in FIG. 9 uses a network topology graph for the network under consideration as an input. In step S902 a node of the network is selected as a candidate node. As in the method shown in FIG. 8, each node is selected in turn as a candidate node.

In step S904 a network topology graph for a sub-network is generated. The sub-network is the network under consideration with the candidate node removed. In step S906 a determination is made whether the sub-network without the candidate node is fully reachable. As discussed above, step S906 may be carried out by applying a possible-path or shortest path algorithm such as the Dijkstra algorithm to each node of the sub-network. If the sub-network is fully reachable, the method returns to step S902 and a new node is selected as the candidate node.

If the sub-network is determined to be not fully reachable, then the method moves to step S908. In step S908, a reachability measure for the candidate network is calculated. The reachability measure may be calculated by applying a shortest path algorithm such as the Dijkstra algorithm to each node of the sub-network. The algorithm returns a set of path-lists for each node in the network that the node under consideration is trying to reach. Each path-list gives the sequence of nodes to be followed to reach that node. If a node is unreachable, then that path-list is null, represented as "Not A Number", NaN. The cardinality of the set of NaNs (representing the number of unreachable nodes) can be readily determined, as can the number of nodes in the network. For each candidate critical node the number of NaNs is divided by the number of nodes to give the reachability measure.

In step S910 the reachability measure is compared with a threshold. In step S912 an indication that the candidate node is a critical node is generated if the reachability measure is above the threshold. Following step S912, the method returns to step S902 and the method repeats until all nodes have been considered.

The algorithm is set out below. In the algorithm below, first a check is made as to whether the network N which comprises i nodes is fully reachable. Then, if the network N is fully reachable, each node i is considered as a candidate node and the sub-network (N-i) not including the candidate node is considered.

---

$\forall$ i $\in$ (N)
    Can i reach all other nodes in N?
If no, END.
If yes:
    $\forall$ i $\in$ (N)
        Is (N-i) fully reachable?
        If yes: i is not a critical node
        If no: Value = (NumberOfUnreachableNodes / NumberOfNodes)
        If Value > Threshold:
            i is a super-critical node
        Else: i is not a super-critical node
Report all super-critical nodes.

---

It is noted that in this embodiment, critical nodes and super-critical nodes are identified. The super-critical nodes in the above embodiment correspond to the critical nodes identified in the embodiments described with respect to FIGS. 8 and 9.

As described above, in some embodiments the output of the method will be a list of just the 'critical nodes', this being the nodes identified as having a large impact on the network if lost. Alternatively, the output may include 'critical nodes' and 'super critical nodes', where the 'critical nodes' include nodes that result in a small part of the network being unreachable if lost and the 'super critical nodes' are those which have a large impact on the network if lost.

In an embodiment, the output may be a ranked list of critical nodes ranked according to the criticality measure.

The list of critical nodes may be used to manage network resources. As an example, the action could be based on the relative rankings, with different weights being applied to the actions at different nodes. For example, transmission power from and to the critical nodes could be linked to the ranking: reduce the power drain on a key node by getting its neighbours to put more effort in (i.e. neighbours transmit higher strength signals, and are prepared to receive weaker signals). As another example, the amount of spectrum and/or bandwidth available to the key node(s) could be increased to make its (their) job easier, by allowing it to transmit at a higher rate and so for less time.

Below is an example of an output algorithm of the algorithm for the bow-tie configuration network shown in FIG. 1

NB: "Node 1: (4, 8)" indicates that Node 1 is at coordinates (4, 8) in this example. The command "OC(10,20,5,2)" is presenting the parameters of room size, number of nodes and transmission range to the simulation.

```
============================================================
|| Room 10x20, 5 nodes with transmission range: 2   ||
============================================================
Test Set 1 bow tie OC(10,20,5,2)
Node 1: (4, 8)
Node 2: (6, 8)
Node 3: (5, 10) << CRITICAL!
Node 4: (4, 12)
Node 5: (6, 12)
=== network IS fully reachable ===
The 1 super critical node is: 3
```

To show the ability of the algorithm to discern between different values of criticality, here is the output from FIG. 6:

```
============================================================
|| Room 10x20, 12 nodes with transmission range: 2   ||
============================================================
Unbalanced network test set "Vulcan" OC(10,20,12,2)
Node 1: (4, 8) –> (nan 0/nd 11) = 0
Node 2: (6, 8) –> (nan 0/nd 11) = 0
Node 3: (5, 10) –> (nan 36/nd 11) = 3.272727e+000 << CRITICAL!
Node 4: (5, 12) –> (nan 20/nd 11) = 1.818182e+000 << NOT CRITICAL!
Node 5: (5, 14) –> (nan 0/nd 11) = 0
Node 6: (3, 6) –> (nan 0/nd 11) = 0
Node 7: (5, 6) –> (nan 0/nd 11) = 0
Node 8: (7, 6) –> (nan 0/nd 11) = 0
Node 9: (2, 4) –> (nan 0/nd 11) = 0
Node 10: (4, 4) –> (nan 0/nd 11) = 0
Node 11: (6, 4) –> (nan 0/nd 11) = 0
Node 12: (8, 4) –> (nan 0/nd 11) = 0
=== network IS fully reachable ===
The 1 super critical node is: 3
The 1 less critical node is: 4
```

In the above example the threshold is set at 2. Thus the reachability measure for node 3 is above the threshold and the reachability measure for node 4 is below the threshold.

In the embodiments described above, the nodes are considered to all be of equal value. Further embodiments are envisaged in which some nodes are more considered to be more valuable than others. Further improvement is possible by incorporating more realistic channel models, environmental factors and the capabilities of different types of node, at the cost of increasing processing and memory demands as the level of precision increases.

The embodiments described above do not require lengthy operational runs of a network to operate. It is noted that after a network has been running for some time, the analysis of node criticality could be a bit moot. Further, embodiments do not require particularly costly mathematics in terms of processor silicon requirements.

Embodiments permit an off line analysis of potential "high value" super-critical routing nodes in a static multi-hop ad hoc mesh network, thereby enabling the operator to proactively and pre-emptively protect or better support those areas of criticality, or modify its dynamic network management strategy according to this information.

While certain embodiments have been described, these embodiments have been presented by way of example only, and are not intended to limit the scope of the invention. Indeed, the novel methods, devices and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The invention claimed is:

1. A method of identifying critical nodes in a wireless network from a network topology graph for the wireless network, the wireless network comprising a plurality of nodes and a plurality of links between the nodes, and the network topology graph for the wireless network indicating the plurality of links between the nodes, the method comprising:
   providing processor-executable instructions on a non-transitory computer-readable storage medium, which when executed on a processor cause the processor to:
   select each node in turn as a candidate node, and
   for each candidate node:
      generate a network topology graph for a sub-network comprising all of the nodes of the wireless network except the candidate node;
      determine from the network topology graph for the sub-network if the sub-network is fully reachable;
      generate an indication that the candidate node is a critical node if the sub-network is not fully reachable; and
      determine a criticality measure for the candidate node if the candidate node is indicated as a critical node, wherein determining the criticality measure for the candidate node comprises determining, for each node of the sub-network, a number of other nodes of the sub-network that cannot be reached from the each node of the sub-network;
   rank each of the plurality of nodes in the wireless network according to the criticality measures; and
   allocate a network resource according to the rank,
   wherein determining from the network topology graph for the sub-network if the sub-network is fully reachable comprises applying a shortest path finding algorithm to the sub-network, and
   wherein allocating the network resource comprises at least one of: adding a new node to a region of the wireless network; boosting power to a one of the plurality of nodes; and replacing a one of the plurality of nodes.

2. A method according to claim 1, further comprising comparing the criticality measure with a threshold and generating an indication that the candidate node is a super-critical node based on the result of the comparison.

3. A method according to claim 1, wherein determining the criticality measure for the candidate node comprises dividing a number of unreachable nodes by the number of nodes in the sub-network.

4. A method according to claim 1, wherein each node of the network is considered to be equal.

5. A method according to claim 1, wherein determining from the network topology graph for the sub-network if the sub-network is fully reachable comprises determining possible paths between the nodes of the sub-network.

6. A method according to claim 1, wherein the shortest path finding algorithm is the Dijkstra algorithm.

7. A method of operating a wireless network using a network topology graph for the wireless network, the wireless network comprising a plurality of nodes and a plurality of links between the nodes, and the network topology graph for the wireless network indicating the plurality of links between the nodes, the method comprising:
   selecting each node in turn as a candidate node, and
   for each candidate node:
      generating a network topology graph for a sub-network comprising all of the nodes of the wireless network except the candidate node;

determining from the network topology graph for the sub-network if the sub-network is fully reachable;

identifying the candidate node as a critical node if the sub-network is not fully reachable; and determining a criticality measure for the candidate node if the candidate node is identified as a critical node, wherein determining the criticality measure for the candidate node comprises determining, for each node of the sub-network, a number of other nodes of the sub-network that cannot be reached from the each node of the sub-network;

ranking each of the plurality of nodes in the wireless network according to the criticality measure; and allocating a network resource according to the ranking, wherein determining from the network topology graph for the sub-network if the sub-network is fully reachable comprises applying a shortest path finding algorithm to the sub-network, and operating or designing the wireless network by allocating a network resource based upon the criticality measure, wherein the allocated network resource comprises at least one of: adding a node to the wireless network; varying power to a one of the plurality of nodes; changing operating performance of a one of the plurality of nodes; replacing a one of the plurality of nodes with a new node with equivalent functionality; and replacing a one of the plurality of nodes with a new node with different functionality and/or operating performance.

8. A method according to claim 7, wherein using the criticality measure to allocate the network resource comprises comparing the criticality measure with a threshold and allocating the network resource based upon this comparison.

9. A method according to claim 7, wherein determining the criticality measure for the candidate node comprises determining, for each node of the sub-network, a number of other nodes of the sub-network that cannot be reached from the said node.

10. A method according to claim 9, wherein determining the criticality measure for the candidate node comprises dividing a number of unreachable nodes by the number of nodes in the sub-network.

11. A method according to claim 7, wherein each node of the network is considered to be equal.

12. A method according to claim 7, wherein determining from the network topology graph for the sub-network if the sub-network is fully reachable comprises determining possible paths between the nodes of the sub-network.

13. A method according to claim 7, wherein the shortest path finding algorithm is the Dijkstra algorithm.

14. A method according to claim 7, wherein the plurality of nodes comprise at least one of sensors and relay communicators.

15. A non-transitory computer readable storage medium carrying processor executable instructions which when executed on a processor cause the processor to carry out a method according to claim 7.

* * * * *